(12) United States Patent
Fripp et al.

(10) Patent No.: US 11,028,687 B2
(45) Date of Patent: Jun. 8, 2021

(54) TRACERS AND TRACKERS IN A PERF BALL

(71) Applicant: Halliburton Energy Services, Inc., Houston, TX (US)

(72) Inventors: Michael Linley Fripp, Carrollton, TX (US); Ronald Glen Dusterhoft, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/613,075

(22) PCT Filed: Sep. 12, 2017

(86) PCT No.: PCT/US2017/051205
§ 371 (c)(1),
(2) Date: Nov. 12, 2019

(87) PCT Pub. No.: WO2019/054991
PCT Pub. Date: Mar. 21, 2019

(65) Prior Publication Data
US 2020/0141226 A1    May 7, 2020

(51) Int. Cl.
*E21B 47/11* (2012.01)
*H04W 4/80* (2018.01)
*E21B 33/13* (2006.01)
*E21B 43/26* (2006.01)

(52) U.S. Cl.
CPC ............. *E21B 47/11* (2020.05); *E21B 33/13* (2013.01); *E21B 43/26* (2013.01); *H04W 4/80* (2018.02)

(58) Field of Classification Search
None
See application file for complete search history.

(56) References Cited

U.S. PATENT DOCUMENTS

| 5,595,245 | A | 1/1997 | Scott, III |
| 8,905,147 | B2 | 12/2014 | Fripp et al. |
| 2007/0169935 | A1* | 7/2007 | Akbar ............... E21B 33/138 166/284 |
| 2012/0175109 | A1 | 7/2012 | Richard |

(Continued)

FOREIGN PATENT DOCUMENTS

WO    2017074364 A1    5/2017

OTHER PUBLICATIONS

International Search Report and Written Opinion dated Feb. 26, 2018; International PCT Application No. PCT/US2017/051205.

*Primary Examiner* — Andrew Sue-Ako
(74) *Attorney, Agent, or Firm* — McGuireWoods LLP (57) ABSTRACT

A perf ball includes a first dissolvable component, an electronic racer and/or a matrix of tracer particles in a wellbore environment. The electronic tracer and at least some tracer particles in the matrix of tracer particles are releasable from the perf ball upon dissolution of the first dissolvable component in a wellbore environment. Some tracer particles in the matrix of tracer particles are dissolvable in oil. Some tracer particles in the matrix of tracer particles are dissolvable in aqueous medium. The electronic tracer can include a sensor and memory for recording properties of the wellbore environment, including any of pressure, temperature, fluid composition, or other environmental, physical, or chemical parameters.

20 Claims, 3 Drawing Sheets

(56) References Cited

U.S. PATENT DOCUMENTS

| | | | |
|---|---|---|---|
| 2013/0020088 A1* | 1/2013 | Dyer | E21B 34/063 |
| | | | 166/373 |
| 2013/0062063 A1* | 3/2013 | Baihly | E21B 34/14 |
| | | | 166/297 |
| 2013/0091943 A1 | 4/2013 | Skillingstad | |
| 2015/0159462 A1 | 6/2015 | Cutler | |
| 2016/0201427 A1* | 7/2016 | Fripp | E21B 33/1208 |
| | | | 166/297 |
| 2016/0298412 A1 | 10/2016 | Fripp et al. | |
| 2016/0319659 A1 | 11/2016 | Molenaar et al. | |
| 2017/0210976 A1* | 7/2017 | Okamoto | E21B 43/26 |
| 2018/0252067 A1* | 9/2018 | Fripp | E21B 33/12 |

* cited by examiner

TRACERS AND TRACKERS IN A PERF BALL

TECHNICAL FIELD

The present description relates in general to wellbore drilling and more particularly to, for example, without limitation, to tracers and trackers in perf balls and methods to manufacture thereof.

BACKGROUND OF THE DISCLOSURE

In the oil and gas industry, hydraulic fracturing is commonly used to drill wellbores to penetrate particular subterranean formations to enable the efficient extraction of embedded hydrocarbons and other types of resources trapped in a rock formation, such as a shale formation. Hydraulic fracturing is often combined with horizontal drilling to reduce the surface disturbance of the drilling operation, and to reach multiple hydrocarbon deposits spread across vast areas.

Horizontal drilling techniques for forming a wellbore often include vertically drilling from a surface location to a desired subterranean depth, from which point, drilling is curved or at a sub-terrain plane approximately horizontal to the surface to connect the wellbore to multiple hydrocarbon deposits. Once the wellbore and support structures have been formed, a perforating gun is lowered down the wellbore and is detonated at multiple locations of the wellbore to generate explosions into the wellbore to create a plurality of perforations along rock formations surrounding the wellbore. A fracking fluid is pumped into the wellbore to create and to augment fractures in the rock formations surrounding the perforations. The fracking fluid may also include particles that help to preserve the structural integrity of the perforations and surrounding fractures during operation of the well.

SUMMARY

According to some embodiments, a perf ball includes a first dissolvable component that is dissolvable in a wellbore environment and a matrix of tracer particles, wherein the matrix of tracer particles are releasable from the perf ball upon dissolution of the first dissolvable component.

In some embodiments, in the matrix some of tracer particles are dissolvable in oil. In some embodiments, in the matrix some of tracer particles are dissolvable in aqueous medium. In some embodiments, in the matrix some of tracer particles are bound by a dissolvable binder. In some embodiments, in the matrix at least some of tracer particles includes about 0.001 vol. % to about 60 vol. % of the perf ball. In some embodiments, the perf ball includes a dissolvable shell. In some embodiments, at least some in the matrix of tracer particles are buoyant in a fracturing fluid. In some embodiments, the first dissolvable component can be any of magnesium alloys and aluminum alloys doped with dopants such as nickel, copper, titanium, and gallium (to accelerate galvanic corrosion), calcium alloys, polyglycolic acid (PGA), polylactic acid (PLA), thiol, polyurethane, EPDM, nylon, or polyvinyl alcohol (PVA).

In some embodiments, the first tracer can be any of monodisperse polyether alcohol compounds, Polyethylene Glycol (PEG)/Polypropylene Glycol (PPG), or their derivatives, any monodisperse polyether alcohol or compound having at least one functional group selected from the group consisting of a primary, secondary, tertiary or quaternary amine, a zwitterionic molecule, a hydroxyl, an amide, a carboxylic acid, a sulphonic acid or a phosphonic acid, or a salt thereof.

A method is described for determining wellbore condition by introducing the perf ball that includes a first dissolvable component that is dissolvable in a wellbore environment and a matrix of tracer particles, wherein the matrix of tracer particles are releasable from the perf ball upon dissolution of the first dissolvable component. In some embodiments, some in the matrix of tracer particles produced to the surface upon dissolution are detected by a detector to provide information, such as the rate of dissolution of the perf ball or identification of the fluid type surrounding the perf ball as oil, aqueous medium or a mixture of both.

According to some embodiments, a perf ball includes a first dissolvable component in a wellbore environment. The first tracer is disposed at a first location within the perf ball, the first tracer including an electronic tracer enveloped in a protective non-dissolvable packaging, wherein the first tracer is releasable from the perf ball upon dissolution of the first dissolvable component in a wellbore environment.

In some embodiments, the protective non-dissolvable packaging is buoyant. In some embodiments, the first tracer produced to the surface upon dissolution is detected by a detector to provide information, such as the location of the perf ball or identification of the fluid type surrounding the perf ball as oil, aqueous medium or a mixture of both. In some embodiments, the perf ball includes a dissolvable shell having a thickness of at least about 1 mm. In some embodiments, the first tracer can be any of radio-frequency identification (RFID) unit, a near field communication (NFC) unit or any other suitable radio or wireless transmission methods or electronic systems. In some embodiments, the first tracer can include a sensor and memory for recording properties of the wellbore environment, including any of pressure, temperature, fluid composition, or other environmental, physical, or chemical parameters.

According to some embodiments, a perf ball includes a first dissolvable component, a first tracer, and a second tracer. The first tracer is disposed at a first location within the perf ball, the first tracer comprising a matrix of tracer particles. The second tracer is disposed at a second location within the perf ball, the second tracer comprising an electronic tracer enveloped in a protective non-dissolvable packaging, wherein the second tracer is releasable from the perf ball upon dissolution of the first dissolvable component in a wellbore environment.

In some embodiments, the first dissolvable component can be any of magnesium alloys and aluminum alloys doped with dopants such as nickel, copper, titanium, and gallium (to accelerate galvanic corrosion), calcium alloys, polyglycolic acid (PGA), polylactic acid (PLA), thiol, polyurethane, EPDM, nylon, or polyvinyl alcohol (PVA).

In some embodiments, the first tracer can be any of monodisperse polyether alcohol compounds, Polyethylene Glycol (PEG)/Polypropylene Glycol (PPG), or their derivatives, any monodisperse polyether alcohol or compound having at least one functional group selected from the group consisting of a primary, secondary, tertiary or quaternary amine, a zwitterionic molecule, a hydroxyl, an amide, a carboxylic acid, a sulphonic acid or a phosphonic acid, or a salt thereof.

In some embodiments, the protective non-dissolvable packaging is buoyant. In some embodiments, the second tracer can be any of radio-frequency identification (RFID) unit, a near field communication (NFC) unit or any other suitable radio or wireless transmission methods or electronic systems. In some embodiments, the second tracer can include a sensor and memory for recording properties of the wellbore environment, including any of pressure, temperature, fluid composition, or other environmental, physical, or chemical parameters.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present disclosure is related to wellbore drilling in a perforation and, more specifically, to tracers in a perf ball (also known as "a perforation ball" and can also be referred to herein as "a sealing ball") used in fracking fluid for a downhole environment and methods to manufacture thereof. Tracers are sometimes referred to as trackers and these terms will be used interchangeably herein. This disclosure relates to a perf ball having a dissolvable portion and at least one tracer. Advantageously, the tracer is buoyant in the fracturing fluid so that it can rise to the surface upon release from the perf ball during dissolution of the dissolvable portion. Although tracers have been used as part of the hydraulic fracturing operation, they have been used in the fracturing fluids itself. The methods and technologies as described herein teach how to use tracers and trackers as integrated components of the perf ball.

A typical wellbore is divided into one or more zones or regions of interest. In hydraulic fracking operations, a perforation gun is detonated to generate explosions into the formation surrounding a zone to create perforations. A wellbore fluid is then pumped into the perforations to create and/or to enlarge fractures within the surrounding formations. The wellbore may be further prepared for production by packing the fractures with gravel to prevent collapse of the fractures, and to facilitate the flow of hydrocarbon resources into the wellbore.

Figure 1:
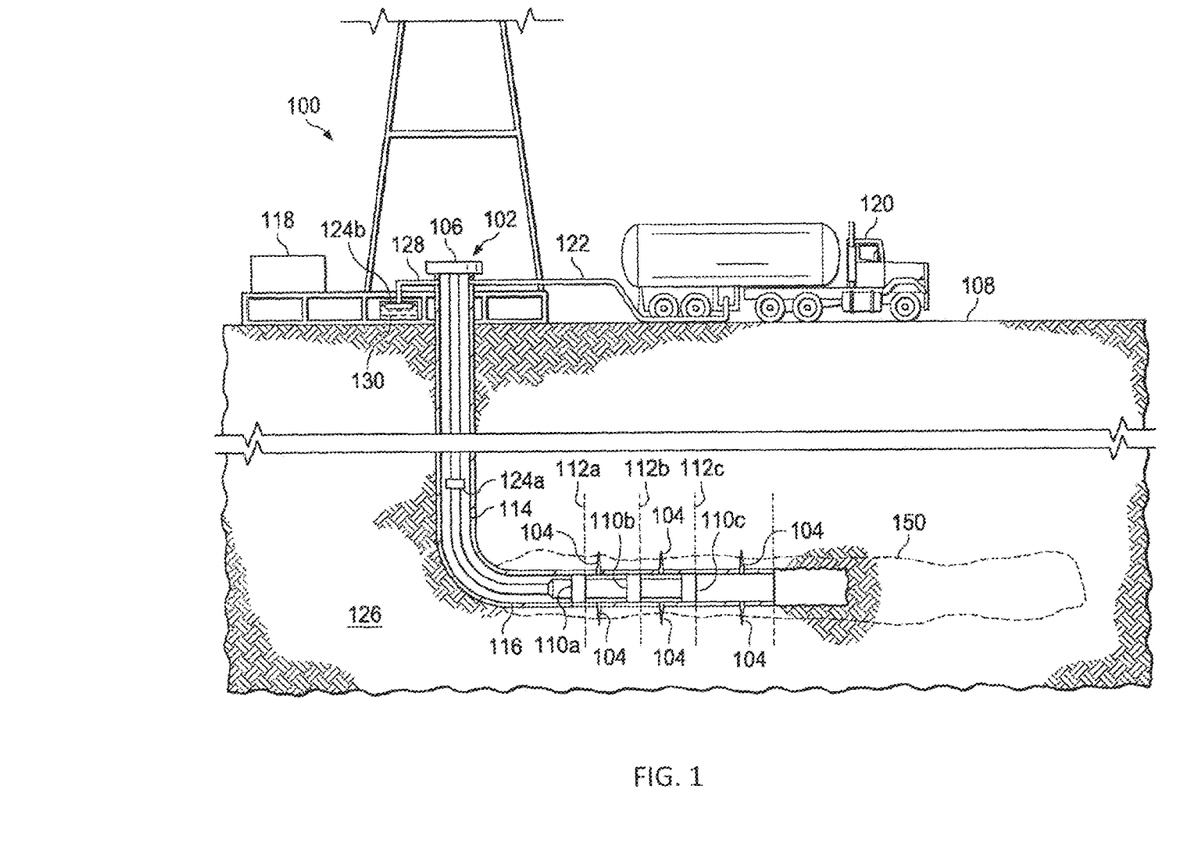
FIG. 1 is a schematic side view of a hydraulic fracking environment that includes a wellbore and multiple wellbore isolation devices disposed at zone boundaries of a wellbore.

FIG. 1 shows an example schematic side view of a hydraulic fracking environment 100 that includes multiple wellbore isolation devices 110a, 110b, and 110c. The wellbore isolation devices 110a, 110b, and 110c are respectively positioned at zone boundaries of zones 112a, 112b, and 112c of a wellbore 114 to isolate each of the first, second, and third zones 112a, 112b, and 112c from other portions of the wellbore 114. In some embodiments, each of the wellbore isolation devices 110a, 110b, and 110c is a fracture plug. In some embodiments, each of the wellbore isolation devices 110a, 110b, and 110c includes a perf ball (not shown). In some embodiments, each of the wellbore isolation devices 110a, 110b, and 110c is a perf ball. In some embodiments, each of the wellbore isolation devices 110a, 110b, and 110c is a fracture plug that includes a perf ball.

As shown in FIG. 1, the wellbore 114 extends from surface 108 of well 102, through formation 126, to target region 150. The target region 150 includes the first zone 112a, second zone 112b, and third zone 112c, and may be formed to include additional zones or fewer zones. A tool string 116 is deployed within the wellbore 114. The tool string 116 is operable to supply pressurized fluid to each of the first zone 112a, the second zone 112b, and the third zone 112c to expand perforations 104 at each respective zone.

At the wellhead 106, an inlet conduit 122 is coupled to the fluid source 120 to provide a pressurized wellbore fluid to the well 102. For example, the pressurized wellbore fluid may be pumped through the inlet conduit 122, down the wellbore 114 and into the third zone 112c to fracture the perforations 104 of the zone. Following the fracking operation, the wellbore isolation device 110c is deployed proximate to the boundary of the third zone 112c to seal and isolate the third zone 112c from other portions of the wellbore 114. The process is then repeated for the second zone 112b and subsequently the first zone 112a, using wellbore isolation devices 110b and 110a, respectively to isolate the second zone 112b and first zone 112a.

Subsequently, fluid may be circulated into the well through the tool string 116 and back toward the surface 108 through an annulus between the outer wall of the tool string 116 and the wall of the wellbore to continue completion efforts. To that end, a diverter or outlet conduit 128 may be connected to a container 130 at the wellhead 106 to provide a fluid return flow path from the wellbore. The wellbore isolation devices 110a, 110b, and 110c may be configured to dissolve upon prolonged exposure to wellbore fluids, including upon exposure to certain solvents that may be included in the wellbore fluid. In such embodiments, the components of the isolation device may be water-soluble (aqueous medium), oil-soluble, or soluble in the presence of other solvent fluids, such as, but not limited to alcohol based fluids, acetone based fluids, and propanediol based fluids.

When fluid is circulated in the well, the return fluid flow path carries debris and particulate from the wellbore, including remnants of dissolved wellbore isolation devices, following dissolution. Such remnants may include insoluble parts, such as tracers or trackers that may be carried in the pressurized wellbore fluid along the fluid return flow path where they are collected in the container 130. In an embodiment, inline detector 124a and collection container detector 124b are placed downhole and at the surface 108, respectively, to detect tracers of the wellbore isolation device as they pass by the detectors 124a and 124b. In some embodiments, operations of the well 102 is monitored by controllers 118 at the surface 108.

In the course of fracking operations, a wellbore isolation device, such as a fracture plug or a frac ball may be disposed at a zone boundary of a zone of the wellbore to isolate the zone from other, adjacent zones and/or from other portions of the wellbore during the foregoing process to release the hydrocarbon resources. The sealing or isolation of a zone enables the zone to be pressurized with fluid without affecting adjacent zones. The fracture zone often can be divided into multiple intervals by incorporation of multiple clusters of perforations. During the fracturing stimulation, some of the clusters may accept much more fluid than other clusters. Perf balls can be used to seal the perforations in the casing at the clusters that are accepting a larger quantity of fluid. This action serves to direct the fracturing fluid into the cluster holes that do not have a perf ball and into enlarging the fracture network. Frac balls are used to hold a pressure gradient in an axial direction while perf balls are used to a hold pressure gradient in a radial direction. For these operations, the perf balls may be produced from a variety of materials, including materials that are partially or completely dissolvable when exposed to a solvent fluid, which may be a wellbore fluid. The use of dissolvable perf balls negate the need to produce out or otherwise execute an extraction operation to remove to the perf balls from the wellbore so that wellbore production operations may commence.

Figure 2A:
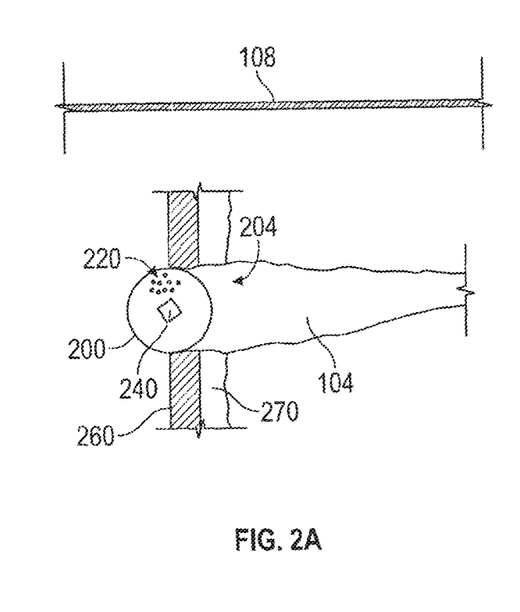
FIG. 2A is a schematic view of a perf ball in a perforation, according to some embodiments.

FIG. 2A illustrates a schematic view of a perf ball 200 used to seal a perforation hole 204 in a casing 260 and a cement 270 at the perforation 104, according to some embodiments. As shown in FIG. 2A, the casing 260 and the cement 270 of the wellbore 114 are initially perforated to access the perforation 104. After creating the perforation hole 204 and operation tasks are completed, the perforation hole 204 can be sealed (or plugged in), at least temporarily, with the perf ball 200 to perform additional downhole operations.

As illustrated in FIG. 2A, the perf ball 200 for this embodiment includes a chemical tracer 220 and an electronic tracer 240. In some embodiments, the perf ball 200 includes a dissolvable component and a non-dissolvable component. In some embodiments, the perf ball 200 includes entirely of a dissolvable component. In some embodiments, the chemical tracer 220 is dissolvable. In some embodiments, the chemical tracer 220 is non-dissolvable. In some embodiments, the chemical tracer 220 can include both dissolvable and non-dissolvable tracer components. In some embodiments, the electronic tracer 240 is non-dissolvable. In some embodiments, the electronic tracer 240 has a protective non-dissolvable packaging or coating. In some embodiments, at least one of the chemical tracer 220 or the electronic tracer 240 can facilitate information from the downhole environment proximate to the perforation 104. After a period of time the perf ball 200 has been disposed to seal the perforation hole 204, the perf ball 200 can begin to dissolve.

Figure 2B:
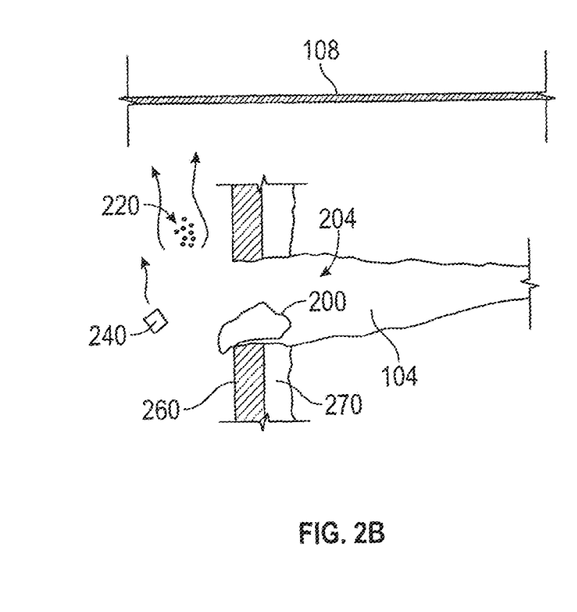
FIG. 2B is a schematic view of a degrading perf ball in a perforation, according to some embodiments.

FIG. 2B is a schematic view of the degrading perf ball 200, according to some embodiments. As illustrated in FIG. 2B, upon dissolution of the dissolvable component, non-dissolvable components, such as the chemical tracer 220 and/or the electronic tracer 240, are produced to the surface 108 (i.e., float up to the surface 108 with the return fluid flow carrying other debris and remnants of dissolved wellbore isolation devices). The produced non-dissolvable components can facilitate information about the downhole environment proximate the perforation 104 and/or along the path of fluid flow to the surface 108. In other words, the dissolution of the perf ball 200 can reveal information about the downhole environment, particularly when the non-dissolvable chemical tracer 220 and/or electronic tracer 240 are produced to the surface 108. For example, if any of the chemical tracer 220 or the electronic tracer 240 reaches to the surface 108, it is an indication (information) that the perf ball 200 is no longer sealing the perforation 104, as illustrated in FIG. 2B. In some embodiments, any of the chemical tracer 220 or the electronic tracer 240 can provide information on the level of dissolution of the perf ball 200. In some embodiments, any of the chemical tracer 220 or the electronic tracer 240 can provide information on the rate of dissolution of the perf ball 200. Said another way, any of the chemical tracer 220 or the electronic tracer 240 can provide information on whether the perf ball 200 has not dissolved, has partially dissolved or completely dissolved.

Although illustrated as a single perforation 104 in FIGS. 2A and 2B, any number of perforations 104 can be included in a given downhole environment. If there are multiple perforations 104, multiple perf balls 200 can be deployed to seal the individual perforations 104. In some embodiments, each of the perf balls 200 can include a unique set of components (e.g., ratio, proportion, number or concentration) of the chemical tracer 220 and/or the electronic tracer 240. Said another way, not all perf balls 200 include the same tracers or compositional make-up, and thus each of the perf balls 200 can contain a unique combination of the chemical tracer 220 and the electronic tracer 240.

In some embodiments, the uniqueness of each of the perf balls 200 and their compositional variations can be exploited to reveal information of the downhole environment upon the dissolution of the perf balls 200. For example, the number, concentration, density, or type of tracers (chemical tracer 220 and electronic tracer 240) produced to the surface 108 can be an indication (information) of the downhole environment proximate to the perforation 104 at which the perf ball 200 resided prior to dissolving. By using unique perf balls 200 comprising unique tracer components, an operator can uniquely identify which components came from which perf balls 200 and thus can infer additional information from the downhole environment.

In some embodiments, the number, concentration, density, or type of tracers (chemical tracer 220 and electronic tracer 240) produced to the surface 108 can be an indication (information) of level of dissolution of perf balls 200 in the downhole environment. In some embodiments, the number, concentration, density, or type of tracers (chemical tracer 220 and electronic tracer 240) produced to the surface 108 can be an indication (information) of partial dissolving of perf balls 200 in the downhole environment. In some embodiments, the number, concentration, density, or type of tracers (chemical tracer 220 and electronic tracer 240) produced to the surface 108 can be an indication (information) that perf balls 200 have completely dissolved in the downhole environment. In some embodiments, the number, concentration, density, or type of tracers (chemical tracer 220 and electronic tracer 240) produced to the surface 108 can provide information on the rate of dissolution of the perf balls 200, locations of dissolved perf balls 200, degrading (dissolving) level of perf balls 200.

In some embodiments, the indication can be identification of the kind of fluid to which the perf ball 200 was exposed. In other words, the indication is identification of the fluid type surrounding the perf ball as oil, aqueous medium or a mixture of both. In some embodiments, the indication can be that the perf ball 200 was in substantial contact with aqueous medium. In some embodiments, the indication can be that the perf ball 200 was in substantial contact with oil. In some embodiments, the indication can be that the perf ball 200 was in substantial contact with both aqueous medium and oil. In some embodiments, the indication can be that the perf ball 200 was in contact with a certain ratio of aqueous medium and oil. In some embodiments, the perf ball 200 was in contact with about 10% aqueous medium and 90% oil. In some embodiments, the perf ball 200 was in contact with about 20% aqueous medium and 80% oil. In some embodiments, the perf ball 200 was in contact with about 30% aqueous medium and 70% oil. In some embodiments, the perf ball 200 was in contact with about 40% aqueous medium and 60% oil. In some embodiments, the perf ball 200 was in contact with about 50% aqueous medium and 50% oil. In some embodiments, the perf ball 200 was in contact with about 60% aqueous medium and 40% oil. In some embodiments, the perf ball 200 was in contact with about 70% aqueous medium and 30% oil. In some embodiments, the perf ball 200 was in contact with about 80% aqueous medium and 20% oil. In some embodiments, the perf ball 200 was in contact with about 90% aqueous medium and 10% oil.

In some embodiments, the indication includes the level of dissolving of the perf ball 200 during dissolution, which can provide information about the level of sealing of the perforation 104. In some embodiments, the indication further includes a pressure differentiation across the perf ball 200, in relation to holding a pressure differential axially along the perforation 104 and across the width (garth) of the perforation 104. This information also indicates the pressure differential in radial and axial directions along the length of the wellbore 114.

In some embodiments, the number, concentration, density, or type of tracers (chemical tracer 220 and electronic tracer 240) produced to the surface 108 can be an indication (information) of the level of pressure being applied in the wellbore 114. In some embodiments, the number, concentration, density, or type of tracers (chemical tracer 220 and electronic tracer 240) produced to the surface 108 can be an indication (information) of whether there was any friction along the path in the wellbore 114.

Figure 3A:
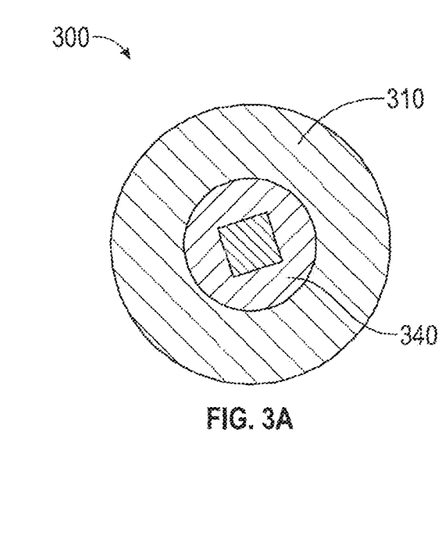
FIG. 3A is a schematic structure of a perf ball, according to some embodiments.

Referring now to FIG. 3A, which shows a schematic structure of an example perf ball 300, according to some embodiments. As illustrated in the figure, the perf ball 300 includes a dissolvable shell 310 enveloping a non-dissolvable core with an electronic tracer 340. Upon dissolution of the perf ball 300 in the downhole environment, the non-dissolvable core with the electronic tracer 340 can be produced to the surface 108. In some embodiments, the perf ball 300 further includes a dissolvable tracer (not shown).

Figure 3B:
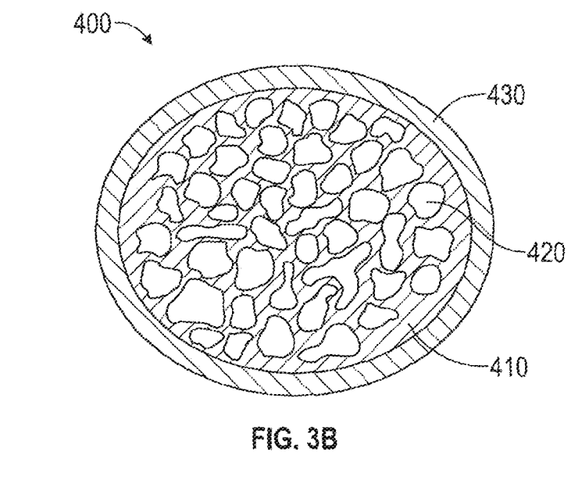
FIG. 3B is another schematic structure of a perf ball, according to some embodiments.

FIG. 3B shows another schematic structure of a perf ball 400, according to some embodiments. As illustrated in the figure, the perf ball 400 includes an inner portion of the perf ball 400 containing a chemical tracer 420 in particulates form, such as a matrix of tracer particles, bound together either with a dissolvable binder 410 and enveloped by a dissolvable shell 430, like a beanbag. In some embodiments, the particles in the matrix of tracer particles lock together during the stress from the hydraulic fracturing. In some embodiments, some the particulates of the chemical tracer 420 are dissolvable. In some embodiments, some particulates of the chemical tracer 420 are non-dissolvable. Said another way, the chemical tracer 420 can include both dissolvable and non-dissolvable tracer components in the shape of particulate.

In some embodiments, some particulates of the chemical tracer 420 are dissolvable when exposed to a fluid, such as oil, but not in aqueous medium. In some embodiments, some particulates of the chemical tracer 420 are dissolvable when exposed to a fluid, such as aqueous medium, but not oil. In some embodiments, some particulates of the chemical tracer 420 are dissolvable when exposed to both aqueous medium and oil, but not other solvents. In some embodiments, some particulates of the chemical tracer 420 are dissolvable when exposed to a specific gas, but not aqueous medium, oil or solvents. Said another way, particulates of the chemical tracer 420 are selectively reactive to a specific chemical and chemical species and ions, group of materials, pH level, pKa level, salinity, and other fluidic and chemical environment.

In some embodiments, some particulates of the chemical tracer 420 are held together by the dissolvable binder 410 so as to form a matrix of tracer particles, such as a composite. In some embodiments, some particulates of the chemical tracer 420 are enveloped by the dissolvable shell 410 for prevention of unintentional chemical reaction and for ease of handle. In some embodiments, the dissolvable binder 410 and the dissolvable shell 430 can be made from the same or substantially similar material to limit the type of material introduced into the downhole environment.

In some embodiments, the perf ball can comprise any of the components from the perf ball 200, the perf ball 300, and the perf ball 400. Said another way, the perf ball can include any of the chemical tracer 220, the electronic tracer 240, the dissolvable shell 310, the non-dissolvable core with tracer 340, the dissolvable shell 410, particulates of the chemical tracer 420, or the dissolvable binder 430.

In some embodiments, the perf balls 200, 300 or 400 (collectively referred to herein as "perf balls") can comprise dissolvable base materials including, but not limited to, a metal, alloy, polymer or a composite comprising any of the metal, alloy or polymer. Examples of such materials include, but not limited to, magnesium alloys and aluminum alloys, magnesium alloys and aluminum alloys doped with dopants such as nickel, copper, titanium, carbon, and gallium (to accelerate galvanic corrosion), calcium alloys, polyglycolic acid (PGA), polylactic acid (PLA), thiol, polyurethane, EPDM, nylon, polyvinyl alcohol (PVA), etc.

In some embodiments, the chemical tracer 220 and particulates of the chemical tracer 420 (collectively referred to herein as "chemical tracers") can comprise a chemical dye, selectively soluble particles, particulates, fibers, or any materials that selectively dissolved in a certain fluid or chemical environment. In some embodiments, the chemical tracers can be any of monodisperse polyether alcohol compounds, Polyethylene Glycol (PEG)/Polypropylene Glycol (PPG), or their derivatives, monodisperse polyether alcohol or compound having at least one functional group selected from the group consisting of a primary, secondary, tertiary or quaternary amine, a zwitterionic molecule, a hydroxyl, an amide, a carboxylic acid, a sulphonic acid or a phosphonic acid, or a salt thereof.

In some embodiments, the electronic tracer 240 and the electronic tracer 340 (collectively referred to herein as "electronic tracers") can include a radio-frequency identification (RFID) unit, a near field communication (NFC) unit or any other suitable radio or wireless transmission methods or electronic systems for identifying the electronic tracers. In some embodiments, the electronic tracers can include a sensor and memory for recording properties of the wellbore environment, including any of pressure, temperature, fluid composition, or other environmental, physical, or chemical parameters. In some embodiments, the electronic tracers can collect data from downhole sensors. In some embodiments, sensors can detect or identify the fluid composition via measurements based on electrical resistivity, capacitance, inductance, magnetic permittivity, permeability, resonant frequency of inductance of surround fluid, resistance-capacitance decay, etc. In other embodiments, the recorded properties of the wellbore environment can be downloaded from the electronic tracers when they are carried by wellbore fluid and reach the surface 108.

In some embodiments, any of the chemical tracers or electronic tracers that are produced to the surface 108 can be detected by the inline detector 124a that monitors fluid flow from the well 102. An example of an inline detector 124a is the ICE Core® Fluid Analyzer from Halliburton. In some embodiments, any of the chemical tracers or electronic tracers that are produced to the surface 108 can be collected and analyzed in the collection container detector 124b at or near the surface 108. In some embodiments, any of the chemical tracers or electronic tracers can provide the operator a better understanding and real-time information regarding fracturing operations in downhole.

In some embodiments, the perf balls are formed or molded into a spherical shape, a spheroidal shape, an ovalular shape, a corpuscular shape, a plate shape, or an acicular shape. The perf balls can be subsequently incorporated with any of the chemical tracers or electronic tracers or any combination thereof. After incorporating any of the chemical tracers or electronic tracers, the perf balls can be molded into the final shape. Alternatively, any of the chemical tracer 220, the electronic tracer 240, the dissolvable shell 310, the electronic tracer 340, the dissolvable shell 410, the chemical tracer 420, or the dissolvable binder 430 can be mounted on the perf balls by mechanically attaching these components to the perf balls after the perf balls have already been made into the final shape.

In some embodiments, the chemical tracers or electronic tracers are integrated with the dissolvable base materials during the construction of the perf balls. For example, the chemical tracers can be mixed with the dissolvable base materials and subsequently compounded together and/or extrusion molded into final spherical perf balls. Similarly, the electronic tracers, which can have a protective non-dissolvable packaging or coating, can be mixed with the dissolvable base materials and subsequently extrusion molded together to form final spherical perf balls.

In some embodiments, any of the chemical tracers or electronic tracers that are designed to produce to the surface 108 upon dissolution are buoyant (or nearly buoyant) so that it can be more easily produced to the surface 108. This approach is especially appealing to the electronic tracers because the non-dissolvable packaging and coating can help to protect the electronics from wellbore fluids and can provide the buoyancy to ensure that the electrical tracer is read by the detectors 124a and 124b. Finally, the non-dissolvable packaging and coating can provide the structure to allow multiple electrical tracers or additional electrical components to be connected together.

In some embodiments, the perf balls can include a low concentration of about 10 ppm, about 100 ppm, or about 1000 ppm of chemical tracers in the perf balls. In some embodiments, the perf balls can include about 0.001 volume % (vol. %) of chemical tracers in the perf balls. In some embodiments, the perf balls can include about 0.001 vol. %, about 0.01 vol. %, about 0.1 vol. %, about 1 vol. %, about 2 vol. %, about 3 vol. %, about 4 vol. %, about 5 vol. %, about 6 vol. %, about 7 vol. %, about 8 vol. %, about 9 vol. %, about 10 vol. %, about 15 vol. %, about 20 vol. %, about 25 vol. %, about 30 vol. %, about 35 vol. %, about 40 vol. %, about 45 vol. %, about 50 vol. %, about 60 vol. %, about 70 vol. %, about 80 vol. %, about 90 vol. %, or about 100 vol. % of the chemical tracers in the perf balls.

In some embodiments, the perf balls can include one electronic tracer in the perf balls. In some embodiments, the perf balls can include two, three, five, ten, or any number of electronic tracers in the perf balls.

In some embodiments, the perf balls can include any vol. % of chemical tracers and any number of electronic tracers in the perf balls.

In some embodiments, the perf balls can have a diameter of about 0.25 inch (in), about 0.5 in, about 0.75 in, about 1 in, about 1.25 in, about 1.5 in, about 1.75 in or about 2 in, inclusive of any diameter values therebetween. In some embodiments, the perf balls can have a diameter of about 1 millimeter (mm), about 2 mm, about 3 mm, about 4 mm, about 5 mm, about 6 mm, about 7 mm, about 8 mm, about 9 mm, about 10 mm, about 12 mm, about 14 mm, about 16 mm, about 18 mm, about 20 mm, about 22 mm, about 24 mm, about 25 mm, about 26 mm, about 28 mm, about 30 mm, about 32 mm, about 34 mm, about 36 mm, about 38 mm, about 40 mm, about 42 mm, about 44 mm, about 46 mm, about 48 mm, or about 50 mm, inclusive of any diameter values therebetween.

In some embodiments, the dissolvable shell 310 and the dissolvable shell 410 can have a shell thickness of at least about 100 nanometers (nm), about 200 nm, about 500 nm, about 1 micrometer (μm), about 2 μm, about 5 μm, about 10 μm, about 20 μm, about 40 μm, about 60 μm, about 80 μm, about 100 μm, about 200 μm, about 500 μm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, or about 10 mm, inclusive of any thickness values therebetween.

The invention claimed is:

1. A method of determining a wellbore condition by introducing a plurality of the perf balls into the wellbore; each of the perf balls in the plurality comprising:
    a first dissolvable component that is dissolvable in a wellbore environment; and
    a matrix of tracer particles, wherein the matrix of tracer particles is releasable from the perf ball upon dissolution of the first dissolvable component;
    placing at least one perf ball of the plurality in a perforation in a wellbore casing; wherein at least two of the perf balls in the plurality individually differ from one another in at least one of the number, concentration, density, or type of tracer particles in each matrix of tracer particles;
    detecting the tracer particles to identify a fluid type surrounding at least one of the perf balls in the plurality as oil, aqueous medium, or a mixture of both.

2. The method of claim 1, wherein at least some tracer particles in any matrix of tracer particles rise to surface of the wellbore upon dissolution where they are detected by a detector to provide information.

3. The method of claim 2, wherein the information is a rate of dissolution of the perf ball.

4. The method of claim 1, wherein at least some tracer particles in any matrix of tracer particles are dissolvable in oil in at least one perf ball in the plurality.

5. The method of claim 1, wherein at least some tracer particles in any matrix of tracer particles are dissolvable in aqueous medium in at least one perf ball in the plurality.

6. The method of claim 1, wherein at least some tracer particles in any matrix of tracer particles are bound by a dissolvable binder in at least one perf ball in the plurality.

7. The method of claim 1, wherein any matrix of tracer particles comprises about 0.001 vol. % to about 60 vol. % of at least one perf ball in the plurality.

8. The method of claim 1, wherein at least one perf ball in the plurality further comprises a dissolvable shell.

9. The method of claim 1, wherein at least some tracer particles in any matrix of tracer particles are buoyant in a fracturing fluid for at least one perf ball in the plurality.

10. The method of claim 1, wherein any first dissolvable component for at least one perf ball in the plurality is any of a doped or undoped magnesium alloy or aluminum alloy, or a polyglycolic acid (PGA), polylactic acid (PLA), thiol, polyurethane, EPDM, nylon, or polyvinyl alcohol (PVA).

11. The method of claim 1, wherein any matrix of tracer particles in at least one perf ball in the plurality is any of monodisperse polyether alcohol compounds, Polyethylene Glycol (PEG)/Polypropylene Glycol (PPG), their derivatives, or any compound having at least one functional group selected from the group consisting of a primary, secondary, tertiary and/or quaternary amine, a zwitterionic molecule, a hydroxyl, an amide, a carboxylic acid, a sulphonic acid or a phosphonic acid, or a salt thereof.

12. The method of claim 1, wherein at least one perf ball in the plurality comprises an electronic tracer enveloped in a protective non-dissolvable packaging, wherein the electronic tracer is releasable from the perf ball upon dissolution of the first dissolvable component.

13. The method of claim 12, wherein the electronic tracer enveloped in the protective non-dissolvable packaging is buoyant in a fracturing fluid.

14. The method of claim 12, wherein the at least one perf ball comprising an electronic tracer further comprise a dissolvable shell having a thickness of at least about 1 mm to about 10 mm.

15. The method of claim 12, wherein the electronic tracer is any of a radio-frequency identification (RFID) unit or a near field communication (NFC) unit.

16. The method of claim 12, wherein the electronic tracer includes a sensor and memory for recording properties of the wellbore environment, including any of pressure, temperature, or fluid composition.

17. The method of claim 12, wherein the at least one perf ball comprising the electronic tracer further comprises an additional non-electronic tracer particle.

18. The method of claim 1, wherein at least one perf ball in the plurality further comprises any matrix of tracer particles disposed at a first location within the perf ball; and an electronic tracer disposed at a second location within the perf ball; the electronic tracer enveloped in a protective non-dissolvable packaging, wherein at least some tracer particles in the matrix tracer particles and the electronic tracer are releasable from the perf ball upon dissolution of the first dissolvable component.

19. The method of claim 18, wherein the electronic tracer is any of a radio-frequency identification (RFID) unit or a near field communication (NFC) unit.

20. The method of claim 18, wherein any matrix of tracer particles comprises at least one non-electronic tracer particle.

* * * * *